(12) United States Patent
Canfield et al.

(10) Patent No.: US 8,567,536 B1
(45) Date of Patent: Oct. 29, 2013

(54) TRACKED CLIMBING MACHINE WITH COMPLIANT SUSPENSION APPARATUS

(76) Inventors: Stephen Lee Canfield, Cookeville, TN (US); James Walter Beard, Cookeville, TN (US)

(*) Notice: Subject to any disclaimer, the term of this patent is extended or adjusted under 35 U.S.C. 154(b) by 495 days.

(21) Appl. No.: 12/657,962

(22) Filed: Jan. 29, 2010

(51) Int. Cl.
*B62D 55/04* (2006.01)
(52) U.S. Cl.
USPC .......... 180/9.3; 180/9.28; 180/9.26; 180/9.21
(58) Field of Classification Search
USPC ........... 180/9.1, 9.21, 9.28, 9.3, 9.5; 305/165, 305/178, 180, 187, 191
See application file for complete search history.

(56) References Cited

U.S. PATENT DOCUMENTS

| | | | |
|---|---|---|---|
| 4,789,037 A | 12/1988 | Kneebone | |
| 4,828,059 A | 5/1989 | Naito et al. | |
| 5,435,405 A | 7/1995 | Schempf et al. | |
| 5,487,440 A | 1/1996 | Seemann | |
| 5,884,642 A | 3/1999 | Broadbent | |
| 5,894,901 A * | 4/1999 | Awamura et al. | 180/9.54 |
| 6,672,413 B2 | 1/2004 | Moore et al. | |
| 7,597,161 B2 * | 10/2009 | Brazier | 180/9.3 |

* cited by examiner

*Primary Examiner* — Tony H. Winner
*Assistant Examiner* — Jacob Knutson
(74) *Attorney, Agent, or Firm* — W. Edward Ramage; Baker Donelson

(57) ABSTRACT

A tracked climbing vehicle containing a compliant suspension apparatus to prescribe the distribution of forces on the adhering members in the tracked climbing machine capable of negotiating irregular surfaces. The compliant suspension apparatus is configured to negotiate irregularities in a climbing-surface without its tracks losing full surface contact and adhesion. It does this by distributing the loads from the climbing machine chassis to the adhering traction members in a specific prescribed fashion to avoid exceeding the allowable force in any adhering traction member and thus significantly improve the performance of the climbing machine.

16 Claims, 10 Drawing Sheets

TRACKED CLIMBING MACHINE WITH COMPLIANT SUSPENSION APPARATUS

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of robotics and more specifically to a self-propelled climbing machine having endless-tracks. Such vehicles may be employed to perform remote operations in locations that are difficult for, or incompatible with, human presence or access. One example is a vehicle that can travel over a steel surface in a vertical, horizontal or upside-down configuration, such as on tanks, pipes, boiler walls or ship hulls, and also carry equipment to perform manufacture, maintenance or inspection functions.

There are many structures which require maintenance, repair, inspection or manufacturing operations that could be performed by a remote machine in a tele-operated or autonomous fashion. Numerous vehicles have been proposed to travel over inclined surfaces, and even operate upside down. These vehicles generally employ legs, wheels, or endless-tracks. Vehicles using endless-tracks provide several advantages, in particular the potential for a large area of contact between the vehicle and contact surface. Endless-tracks provide exceptional potential for large-area surface contact between the track-members (for example magnets) and the climbing-surface.

This invention concerns vehicles of the endless-track type with magnetic track-members incorporated in the endless-tracks. These vehicles are intended to operate on significant inclines, or upside down and/or on surfaces having, alone or in combination, concave, convex or irregular contours.

The endless-track type climbing vehicles available in previous technologies, may have, adhering track-members attached to the tracks and employ an endless-track of specific properties, to include very high tensile stiffness of the endless-track itself, in the axial direction of the track, but negligible stiffness in all transverse directions and negligible stiffness with respect to in bending. This creates a technological disadvantage in that the track in such cases is capable of supporting tensile forces, but, has only minimal stiffness in bending or in torsion for small angles it. Accordingly, it can support only negligible loads in any other direction, cannot support shear side-loads, and cannot support compressive loads.

To more closely examine circumstances under which this disadvantage becomes apparent, we note that for such a climbing vehicle to remain in equilibrium in any given position and orientation on a climbing-surface, forces affecting that equilibrium must be transferred from the climbing-surface to the vehicle. For a simple track type climbing vehicle, these forces are transferred from the track-members to the vehicle chassis through tensions in the endless-track. This would, ideally, allow the endless-track to accommodate irregular climbing-surface, but would concurrently result in localizing, on the outer adhering track-members, all of, or a majority of, the forces necessary to affect and maintain positional and orientational equilibrium with the climbing-surface.

The surface normal forces are a subset of the total forces that are required to maintain vehicle equilibrium on the climbing-surface. The surface normal forces are perpendicular to the climbing-surface and are required for equilibrium. To distribute this subset of forces in a manner intended to maintain equilibrium between the climbing vehicle and the climbing-CS, one might envision employment of a rigid guide section that slidably connects to the endless-track. But, this approach creates its own set of disadvantages in that it causes the surface normal forces to be localized on individual adhering track-members whenever and wherever climbing-surface irregularities are encountered.

The performance of an endless-track type climbing vehicle depends directly on the effective ability of the track, and accordingly, the track-members, to adhere to the climbing-surface. Numerous patents exist for climbing vehicles containing endless-tracks with adhering track-members incorporated into the tracks. One shortcoming of these previous technologies is their universal lack of a means to distribute the load among these adhering track-members in a manner that can accommodate a wide variety of surface geometries. Creation of such a load distribution means would significantly improve the performance of these climbing vehicles, and is, therefore, a desirable advancement in the art.

As is detailed below, previous technologies do not provide effective means to distribute the load among a plurality of adhering track-members.

Thus, an invention such as described herein, that distributes the forces required to maintain equilibrium between the vehicle and climbing-surface during operation among a plurality of adhering track-members, is novel to the state of art and is usefully and directly applicable to climbing vehicles having, or requiring, adhering track-members incorporated in endless-tracks. The herein taught art comprises a compliant suspension apparatus that distributes stiffness (and correspondingly the forces of equilibrium) relative to the plurality of adhering track-members.

The following discussion details and contrasts the instant art with illustrative examples of previous technologies and their associated shortcomings that the instant art overcomes.

U.S. Pat. No. 5,894,901, by Awamura, presents a traditional suspension system consisting of a plurality of press wheels equipped with elastic members (springs). These are capable of providing adjustment to the adhering members directed in to the climbing-surface only. The device provides, in contrast to the instant art, no means to compensate for, or to integrate, any other forces or balance adjustments. Although, as does the instant art, the Awamura et al. device includes magnets, an endless-track, and a suspension system, as designed, it only makes provision to adjustments necessary to push the magnets into contact with the climbing-surface. The device is equipped with auxiliary wheels, each wheel having a suspension supported by the vehicle body, pressing the wheel against the endless-track. These wheels are each supported by an elastic member in communication with the vehicle chassis. This is in contrast to the instant applicant's use of a compliant beam guide and support which automatically adjusts to balance the load carried and to maximize traction U.S. Pat. No. 5,435,405 by Schempf, et at teaches a reconfigurable mobile robot with magnetic tracks.

In contrast to the instant art, which uses permanently active magnets in the tracks, U.S. Pat. No. 5,435,405 by Schempf, et al teaches a magnetic system that can be activated and deactivated in the propulsion tracks. In further contrast, no guide, rigid or otherwise is mentioned with respect to the endless-track. Finally, unlike the instant art, the track appears to have no track-guide.

U.S. Pat. No. 4,789,037 by Kneebone uses two or more endless-tracks with plurality of permanent magnetic adhering members. Each adhering member comprises a permanent magnet sandwiched between magnetic metal plates. The magnet does not, itself, contact the climbing-surface, but contacts only these metal plates. As taught, it does allow pivotal rocking motion of track assemblies relative to the vehicle body, for negotiating uneven or curved surfaces, the track assemblies comprising, for each track unit, two laterally spaced chains, each forming an endless member. The device also uses a pump in the center of the body to apply additional upward or downward pressure to press the tracks onto the climbing-surface, and does teach a fan to create suction force normal to the climbing-surface. But the patent mentions no sort of trackguide, rigid or otherwise.

U.S. Pat. No. 5,884,642 by Broadbent teaches endless-tracks with plurality of magnetic sections, each tread using four rare earth magnetic segments, adjacent treads being oriented in opposing polarities. It does not, however, discuss any type of guide for the tracks, nor automatic balance control or adjustment.

U.S. Pat. No. 4,828,059, by Naito, et al. employs a track guide that is used only to engage and disengage track magnets from climbing-surfaces. Locations of loads carried by the Naito device are limited to remaining within the upper and lower planes of the endless propulsion tracks. It employs a plurality of permanent magnets on outer surface of crawler tracks and has a guidance device on crawler tracks for restraining and releasing crawler track from moving relative to crawler body in direction normal to traveling plane of magnets. It also includes a track control mechanism so designed such that the guidance device can restrain or release motion of the track to the main body in a direction normal to the surface. When this guide load is released, the load is essentially transferred in its entirety, to only the end magnets of the tracks.

U.S. Pat. No. 5,487,440, by Seemann presents a rigid guide, and a pair of parallel, endless-tracks equipped with suction cup feet These tracks slide along a grooved structure that allows for communication between a vacuum pump and those suction cups which are positioned for contact with the climbing-surface. It makes little or no provision for significant surface irregularities.

U.S. Pat. No. 6,672,413 B2 by Moore, et al. describes a remote controlled inspection vehicle utilizing magnetic adhesion to traverse non-horizontal, non-flat, ferromagnetic surfaces. Although this device employs magnets to adhere to the climbing-surface, no magnets are attached to, or guided by a track. The magnets are, rather, attached directly to the vehicle. The track comprises modules each of which contains a permanent magnet that the endless-track surrounds. These modules are so constructed as to pivot about longitudinal axes in an attempt to conform to pipes or other irregularities.

BRIEF SUMMARY OF THE INVENTION

In accordance with a preferred embodiment of the invention, there is disclosed a tracked climbing machine having one or more revolving or cyclical gripping devices with adhering track-members. The revolving or cyclical gripping device is preferably in the form of one or more closed or endless, tracks, chains, belts, or cables upon the exterior of which the previously mentioned adhering track-members are mounted.

This tracked vehicle can climb vertical surfaces and overhangs, and negotiate surface irregularities, and in doing so, prevent its tracks from losing full surface contact and adhesion.

Its innovations are particularly useful in transiting, ascending and otherwise negotiating unprepared boiler sides, submarine hulls, ships sides, towers and other ferrous structures to perform automated or remotely controlled inspection, maintenance, and cleaning tasks that could not otherwise be accomplished. The device is notably adept at climbing vertical surfaces and overhangs and it is able to negotiate surface irregularities without its tracks losing full surface contact and adhesion.

It moves and climbs in a manner employing multiple feet, preferably aligned in two or more columns, by applying, adjusting, and releasing each individually gripping foot in response to whatever surface contour may be encountered by that particular foot.

A significant advance introduced by this technology is the bias devices installed along the compliant beam. These devices exert forces on the beam, in such as way as to distribute the pressure of the track in a uniform manner, even when the transited surface is non-planar. This particularly improves overall track performance when transiting small bumps or hummocks on the surface.

Further objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

Figure 1:
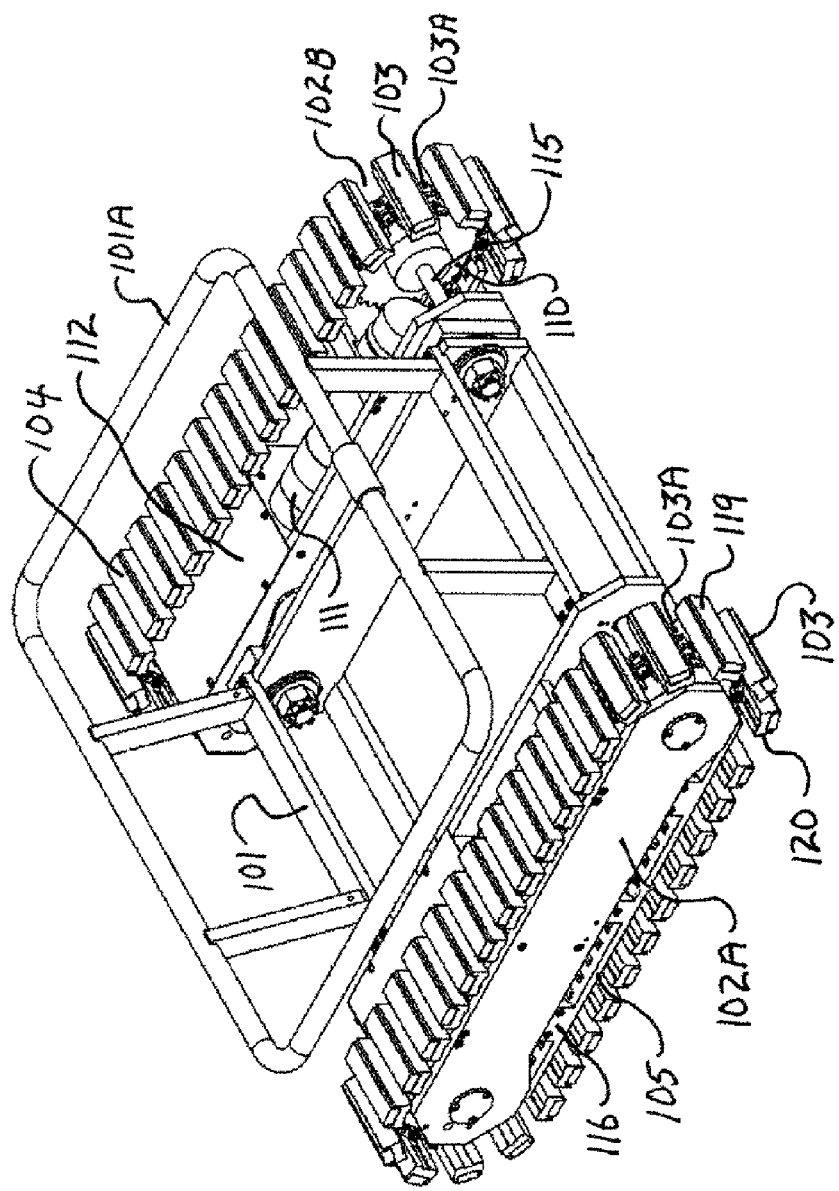
FIG. 1 is an isometric view of the climbing vehicle composed of the vehicle chassis, two track-modules, and endless-track.

LIST OF NUMBERED ELEMENTS 101 vehicle chassis
101a chassis payload-rack
102a port side track-module
102b starboard side track-module
103 endless track
103a track sliding-members
104 adhering track-members
105 compliant beam
106 fore tangential guide-linkage
107 aft tangential guide-linkage
108 contour-following bias-device
108a fore contour-following bias-device
108b midship's contour-following bias-device
108c aft contour-following bias-device
109 drive-sprocket
110 track-sprocket
111 drive-motor
112 transmission
113 guide-slot
114 drive-sprocket axle
115 track-sprocket axle
116 compliant suspension apparatus
118 tensioning mechanism
119 magnet
120 support-block
121a fore bias-adjuster
121b mid bias-adjuster
121c aft bias-adjuster
D1 direction of motion
CS climbing-surface
CI contour or irregularity
u1 axis u1 normal to the climbing-surface CS
u2 axis u2, in the plane of the climbing-surface CS and normal to the axis of the
direction of movement endless-track
u3 axis along track direction of motion D1
R1 first independent track-module axes of limited rotational freedom about an axis in the plane of the climbing-surface CS
R2 second independent track-module axes of limited rotational freedom about an axis in the plane normal to that of the climbing-surface CS

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 2:
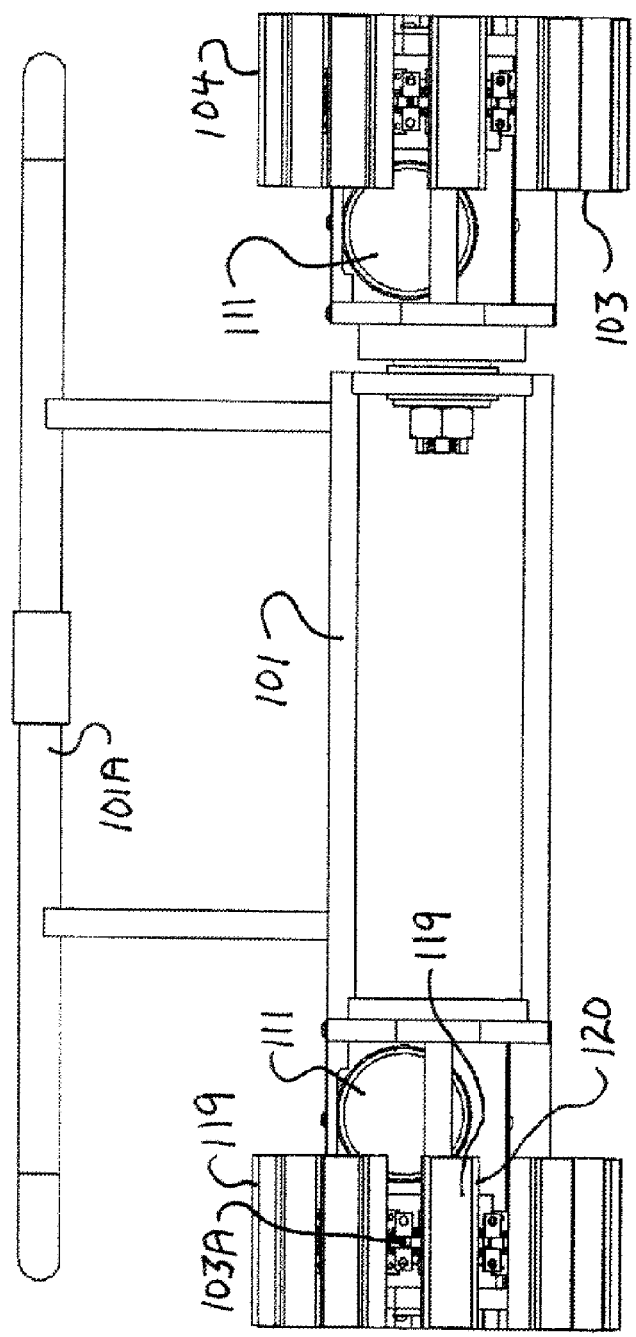
FIG. 2 is a front view of the climbing vehicle showing a front view of the vehicle chassis, track-modules, and endless-track.

Referring to FIGS. 1 and 2, we see illustrated a self-propelled vehicle for traversing a surface, comprised of a vehicle chassis 101, to which a payload may be attached. The vehicle is equipped with one or more track-modules 102a, 102b that support the vehicle chassis 101, and which support endless-tracks 103, these tracks 103 incorporating a plurality of magnetic track-members 104 spaced along each endless-track 103. The chassis 101 may be adapted to carry a multiplicity of payloads, tools or equipments.

Referring to FIGS. 3, 4, and 7-9, this endless-track 103 with track-members 104, cyclically moves in such a way as to provide locomotive force. When the vehicle is in motion, portions of the track are constantly cycling through a traction-portion of its cycle, wherein they make contact with the climbing-surface CS. Referring to FIGS. 4, 5, and 7-9, a compliant suspension apparatus 116 incorporates a compliant beam member 105 to which the revolving or cyclical track 103 is slidably connected.

In short summary of the device and its operation, the climbing vehicle and chassis 101 are subject to a variety of forces, including gravitational and dynamic loads associated with the vehicle and payload motion, as well as to forces generated by the operation of the tooling or equipment attached to the vehicle. These forces are to be transferred to the climbing-surface CS through the endless-track 103 and adhering track-members 104 preferably permanent magnets 119. The forces are compensated for by the compliant suspension apparatus, and bias devices, adjusted according to Hooke's law which relates force, displacement and stiffness. This adjustment may be applied automatically or manually.

The suspension and compliant beam apparatus of this device dictate how the above forces are transmitted from the vehicle chassis 101 to the adhering track-members 104 over a wide range of surface irregularities or contours CI of the climbing-surface CS. This apparatus, a combination mechanism of a compliant beam 105 slidably connected to the track 103, rigid-body members, and bias-devices or springs 108, maximizes track contact with the climbing-surface CS in a manner different from and superior to previous technologies and permits the flexible endless-track to propel and support a rigid vehicle chassis in a more continuous, and therefore more effective manner.

Figure 5:
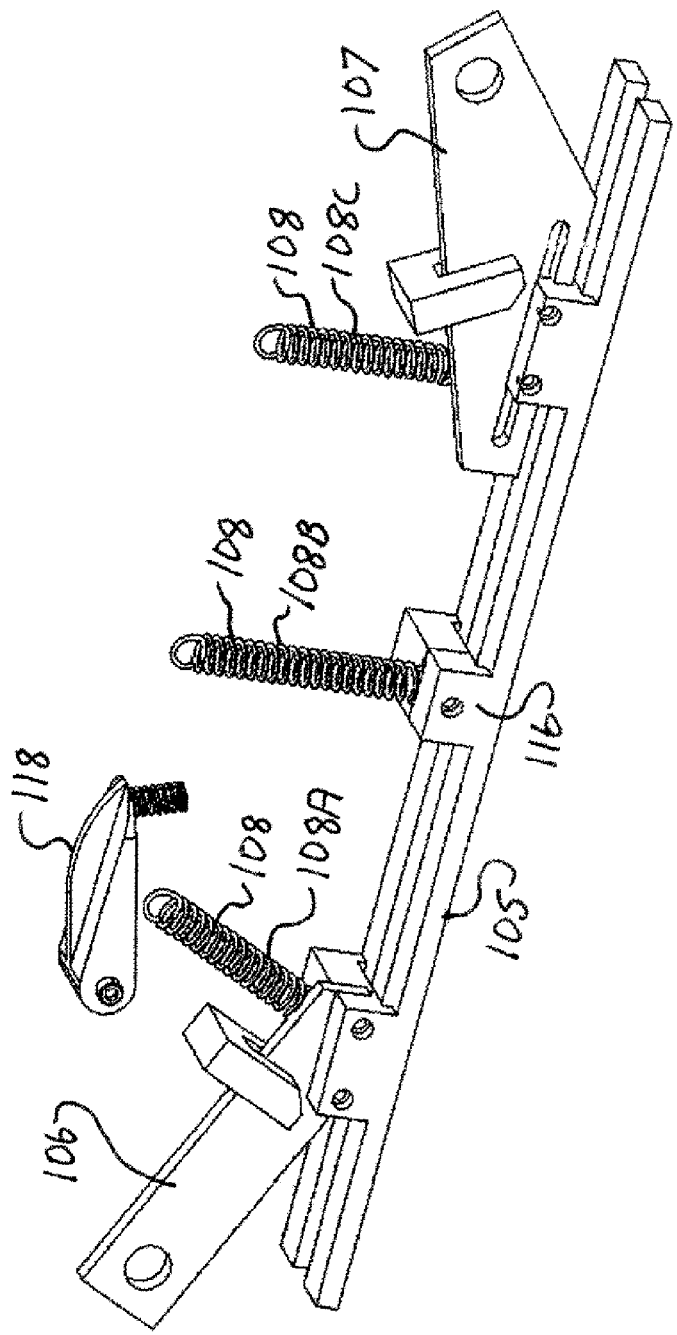
FIG. 5 shows the primary components of the compliant suspension apparatus isolated from the track-module.

The apparatus which achieves the above prescribed stiffness or compliance consists of three primary components. These components are shown in FIG. 5 as: the one or more compliant beams 105, the rigid-body tangential guide-linkages, 106, 107 and the contour-following bias-device elements, 108. A compliant beam 105 is slidably attached to the endless-track 103. The compliant beam 105 geometric and material properties are established to be compatible with the geometry of a climbing-surface CS having a wide range of contours or irregularities.

Figure 10:
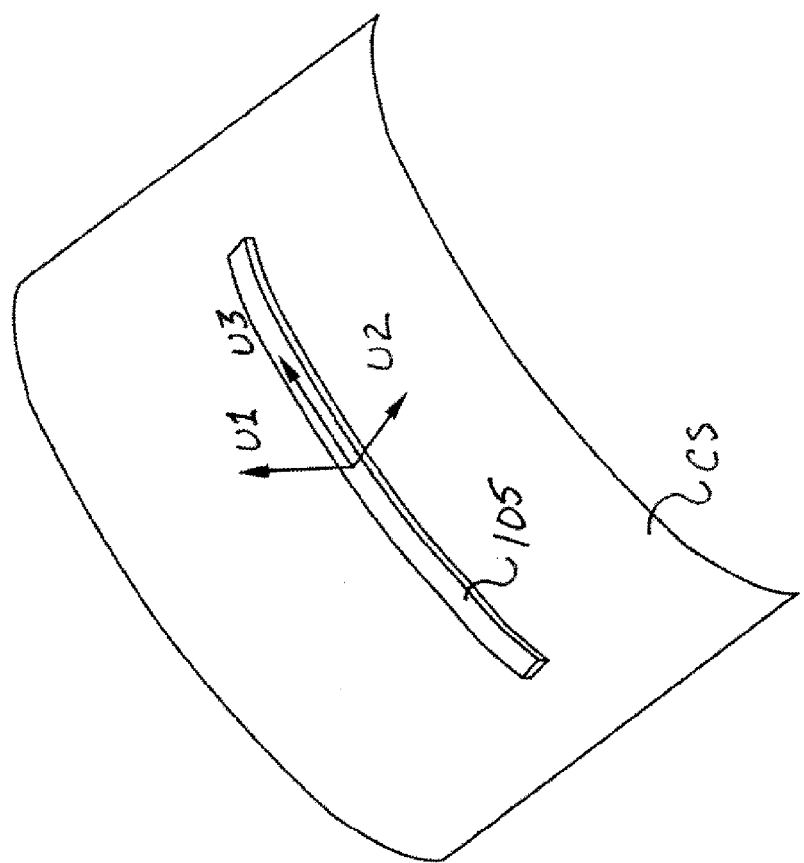
FIG. 10 shows a diagram of the climbing-surface CS, with compliant beam. A basis set of directions are defined at a point along the compliant beam, as u1, a unit axis normal to the climbing-surface CS, u2 along the axis of the endless-track at this point, and u3 the right-hand axis of the frame.

The compliant beam 105 of FIG. 10 is conjugate and slidably connected to the endless-track (not shown) and prescribes five specific stiffness (or compliance) components between the climbing-surface CS and the climbing machine body. These include all axis cardinal directions in three-dimensional space except the direction of movement D1 of the endless-track. Since the compliant apparatus is slidably connected to the endless-track, no stiffness is prescribed on that axis of the endless-track.

Listing the components addressed, they are, as shown in FIG. 10.

1) translational stiffness along unit axis u1 normal to the climbing-surface CS 2) translational stiffness along unit axis u2, in the plane of the climbing-surface CS and normal to the axis of the endless-track 3) rotational stiffness about u1 normal to the climbing-surface CS 4) rotational stiffness about u2, an axis in the plane of the climbing-surface CS and normal to the axis of the endless-track, and 5) rotational stiffness about u3, the axis of the endless-track.

The linear stiffness along u1 is prescribed along the entire track to uniformly distribute the forces on the adhering track-members. The linear stiffness along u2 is prescribed to limit transverse deflection of the endless-track (high stiffness) The rotational stiffness about u1 is prescribed to limit rotation of the endless-track (high stiffness) about an axis normal to the climbing-surface CS. The rotational stiffness about u2 is prescribed to allow low stiffness along the center portion of the endless track to accommodate contours or irregularities in the climbing-surface CS, and high stiffness where the endless-track engages the track-sprockets.

The rotational stiffness, about u3 is prescribed to allow low stiffness along the center portion of the endless-track to accommodate contours or irregularities in the climbing-surface CS, and high stiffness where the endless-track engages the track-sprockets.

As noted above, the compliant beam 105 provides a surface conjugate to the endless-track 103 in a slidable connection. The fore tangential guide-linkage 106 enforces the stiffness and geometry of the compliant beam 105 conjugate to the endless-track 103 at the point where the endless-track 103 engages the drive-sprocket 109. The aft tangential guide-linkage 107 enforces the stiffness and geometry of the compliant beam 105 conjugate to the endless-track 103 at the point where the endless-track 103 engages the track-sprocket 110. The contour-following bias-device members to 108a, 108b, 108c prescribe the stiffness of the compliant beam 105 in the u1 direction to more uniformly distribute the forces in the adhering track-members 104.

Figure 4:
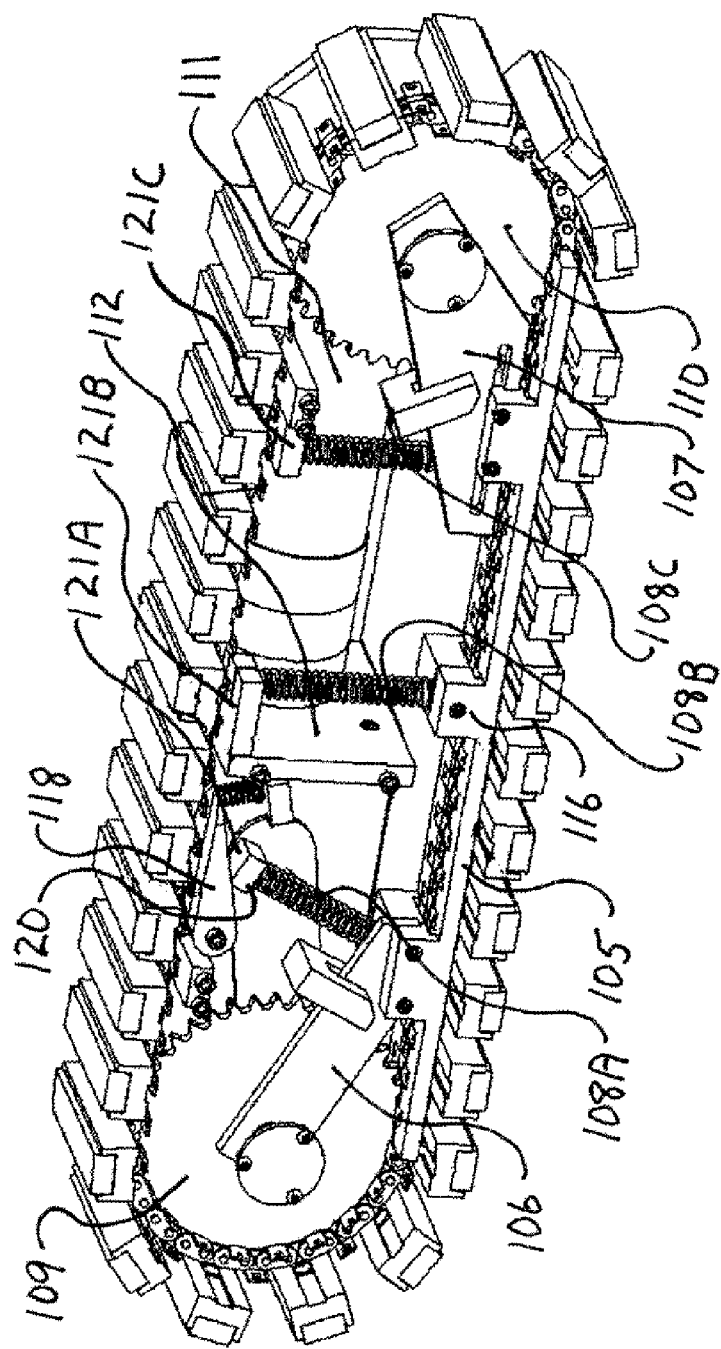
FIG. 4 gives an isometric view of a single track-module with the exterior cover cut away showing the compliant suspension apparatus consisting of compliant beam member, fore tangential guide link, aft tangential guide link, contour-following bias-devices, fore, mid and aft bias adjuster and tensioning mechanism. Also shown in FIG. 4 are the track drive components; drive-sprocket, track-sprocket, drive-motor, and transmission.

This compliant beam member 105 is so contrived and adjusted, by means of contour following bias devices 108, 108a, 108b, 108c and adjustors, 121a, 121b, and 121c, (See FIG. 4.) These bias-devices 108 are located at points along the compliant is beam 105, such that each bias-device 108 exerts force upon the compliant beam 105 at its particular point on the beam 105. This changes the force of the track 103 against the transited surface CS at that particular tension point. The change of force at this point creates a force to pull portions of the track, 103 more firmly against the transited surface CS by promoting deformation of the compliant beam 105 to conform with the topography of the surface CS being transited.

This causes track 103 force against the transited surface CS, to be more equally distributed, promoting increased surface contact of all adhering members along the rest of the track, thereby maximizing the area over which the adhering members of the endless track contact the transited surface and distributing the force along the track. The benefits of these effects are particularly notable when and where the track encounters small bumps, hummocks or other irregularities CI in the climbing surface CS.

A useful way of understanding this innovation is to imagine this climbing machine, inverted, transiting an overhead surface CS, essentially clinging magnetically to, and hanging from, the ceiling. In such a position, one can see the benefit of distributing the load along the track 103 through the bias devices and simultaneously ensuring positive pressure between the track 103 and the overhead surface CS at each end of the track. In the same way, referring to FIGS. 8, 9, and 10, one can see that as the device passes over an irregularity CI, the portion of track 103 not in contact with the irregularity CI would tend to be pushed out of contact with the climbing surface CS, were it not for the bias devices 108. But, because of the tension exerted by the bias device 108 on the track 103 in the vicinity of the irregularity CI, the rest of the track 103 tends to be pulled more firmly into contact with the climbing surface CS.

Thus the track 103, and the compliant beam 105, tend to better adapt to contours CI of climbing-surfaces CS in such as way as to allow the magnetically adhering track-members 104 to maintain traction on the surface CS. The system is powered by the drive-motor 111 and transmission 112 that propels the track via one or more drive-sprockets 109

Referring to FIG. 2, the chassis 101 is attached to the track-modules 102a and 102b in a manner that allows two degrees of rotary movement between each track-module 102a, 102b and the chassis 101. As shown in FIG. 1, this movement is about two independent axes R1 being an axis in the plane of the climbing surface, and R2 being an axis normal to the climbing-surface CS.

Figure 3:
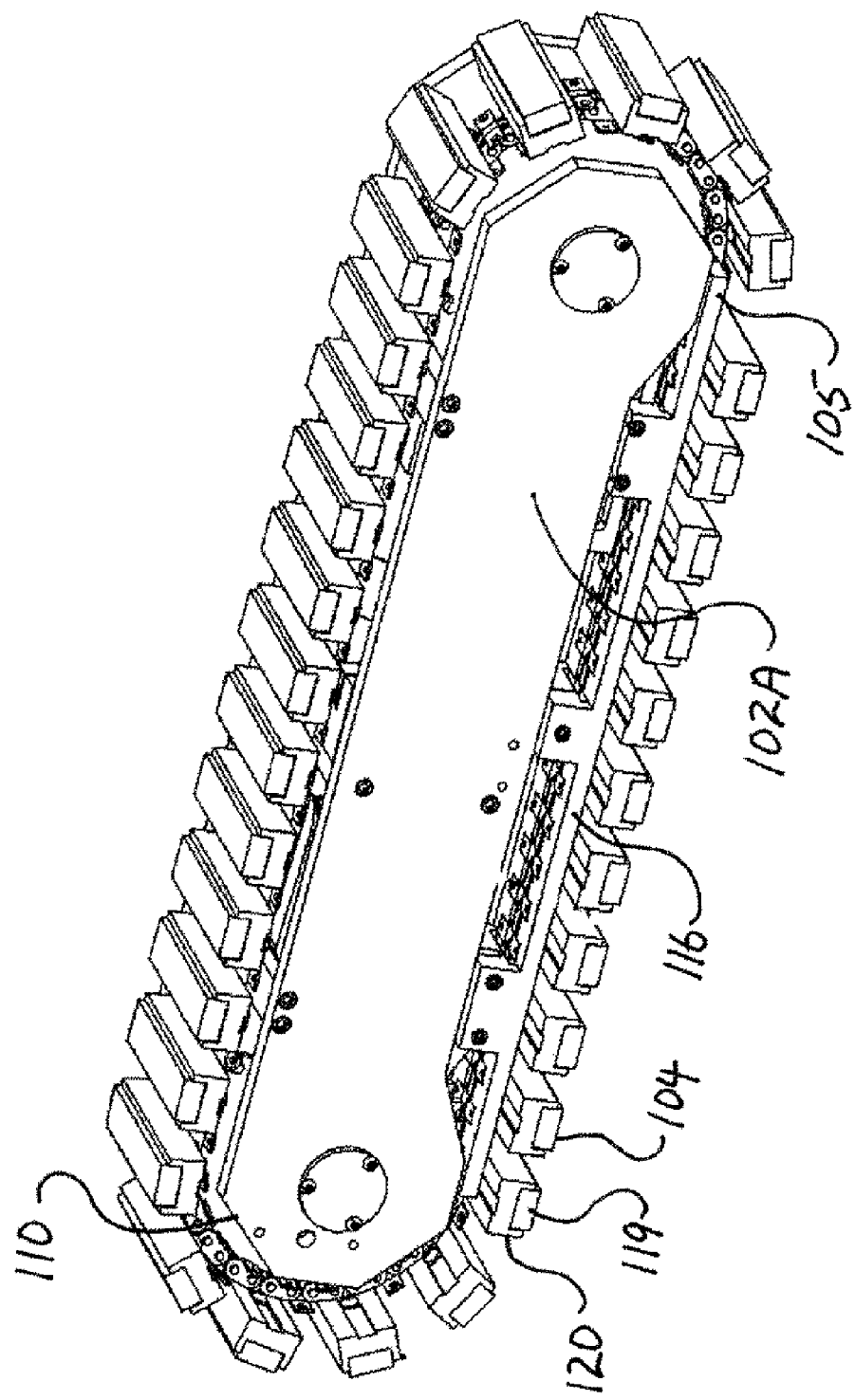
FIG. 3 is an isometric view of a single track-module showing the endless-track and adhering track-members.
Figure 6:
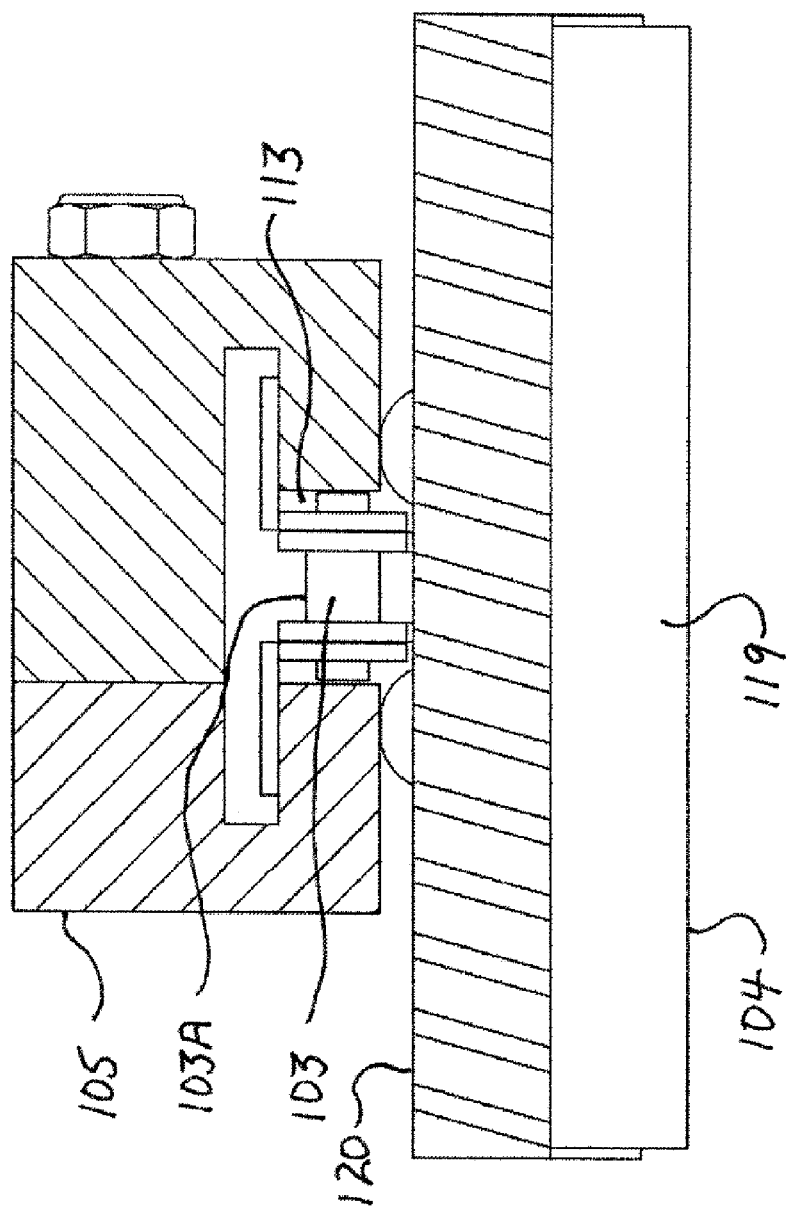
FIG. 6 shows a cross-sectional end-view of the slidable connection between the compliant beam member, the endless-track, and the sliding track-member, guided through guide-slot and also of the support block, magnetic adhering track member, and the connection between the adhering track-member, and the endless-track.
Figure 7:
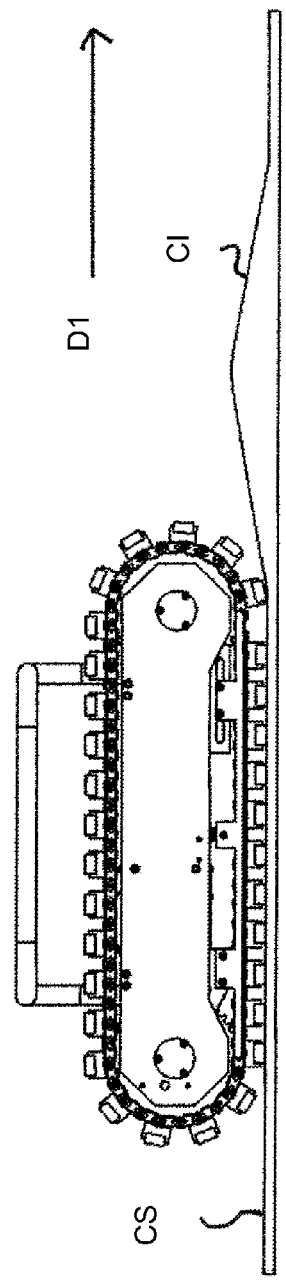
FIGS. 7, 8, and 9 are side views of the device moving in direction D1, encountering an irregularity CI in a climbing-surface, CS, also showing operation of the compliant suspension apparatus.

Referring to FIGS. 6 and 7, the adhering track-members 104 each are preferably comprised of a magnet 119 located in a support-block 120. Referring to FIGS. 3 and 4, the support-block 120 is connected to respective sections of the endless-track 103, and sliding member 103a in the guide-slot 113, so that necessary relative motion is available to allow the assembly of endless-track 103 and adhering track-members 104 to pass along and around the path described by the location of the drive and track-sprockets, 109 and 110, the track tensioning mechanism 118, and the guide-slots 113, in the compliant beam member 105.

Referring to FIGS. 3 and 4, a compliant suspension apparatus 116 is contained within the track-module 102a and 102b. The compliant suspension apparatus 116 consists of compliant beam member 105, fore tangential guide-linkage 106, aft tangential guide-linkage 107, and a plurality of contour-following bias-devices 108a, 108b, and 108c.

The compliant beam member 105 is slidably connected to the endless-track 103 through guide-slots 113. The fore tangential guide-linkage 106 is rigidly attached to the compliant beam member 105 and pivotally connected to the track-module 102a at the drive-sprocket axle 114. The aft tangential guide-linkage 107 is slidably connected to the compliant beam member 105 and pivotally connected to the track-module 102a at the track-sprocket axle 115.

The endless-track 103 engages drive-sprocket 109 and track-sprocket 110. The drive-sprocket 109 and track-sprocket 110 are pivotally connected at the drive-sprocket axle 114 and track-sprocket axle 115 respectively to the track-module 102a to permit pivotal movement of the drive and track-sprockets, 109 and 110. The drive-sprocket 109 is driven by a drive-motor 111 through a transmission 112. Each track-module 102a, 102b is independently driven, allowing the vehicle to by propelled and steered by judicious control of speed and direction of the drive-motor(s) 111.

The endless-track 103 engages the track tensioning mechanism 118. The track tensioning mechanism 118 is pivotally connected to the track-module 102a and is biased with a track-tension bias-device 118 to provide tension in the endless-track 103, as the length of endless-track 103 in contact with the climbing-surface CS varies according to the surface irregularities or contours encountered CI.

The forward external contour-following bias-device 108a is pivotally connected to the compliant beam member 105 and pivotally connected to the track-module 102b. The aft contour-following bias-device 108c is pivotally connected to the fore tangential guide-linkage 106 pivotally connected to the track-module 102b. The aft contour-following bias-device 108 is pivotally connected to the aft tangential guide-linkage 107 and pivotally connected to the track-module 102b as shown in FIG. 4.

In operation, the vehicle chassis 101 is positioned with track adhering members 104 in contact with a climbing-surface CS. Then, the drive-motor(s) 111 are activated. Proceeding along the climbing-surface CS, the adhering track-members 104 make sequential contact, each in its turn, with the climbing-surface CS, while the endless-track 103 slides along the compliant beam member 105, thereby propelling the vehicle.

Figure 8:
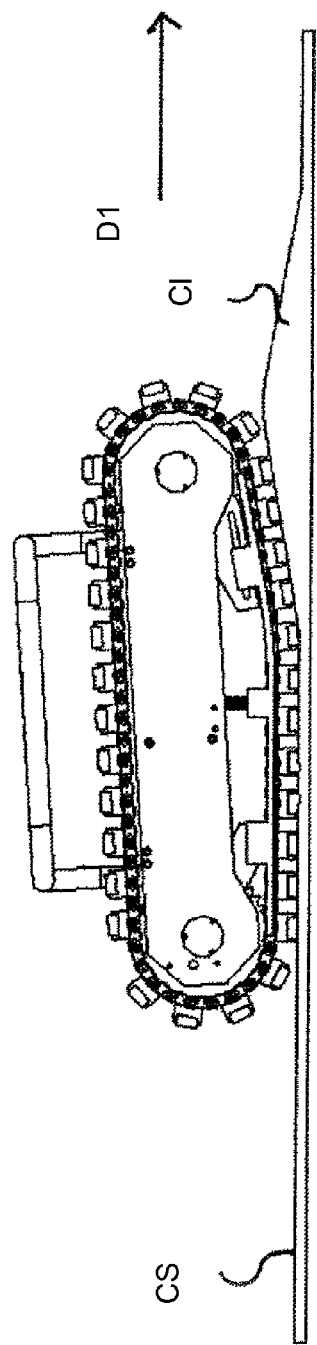
Figure 9:
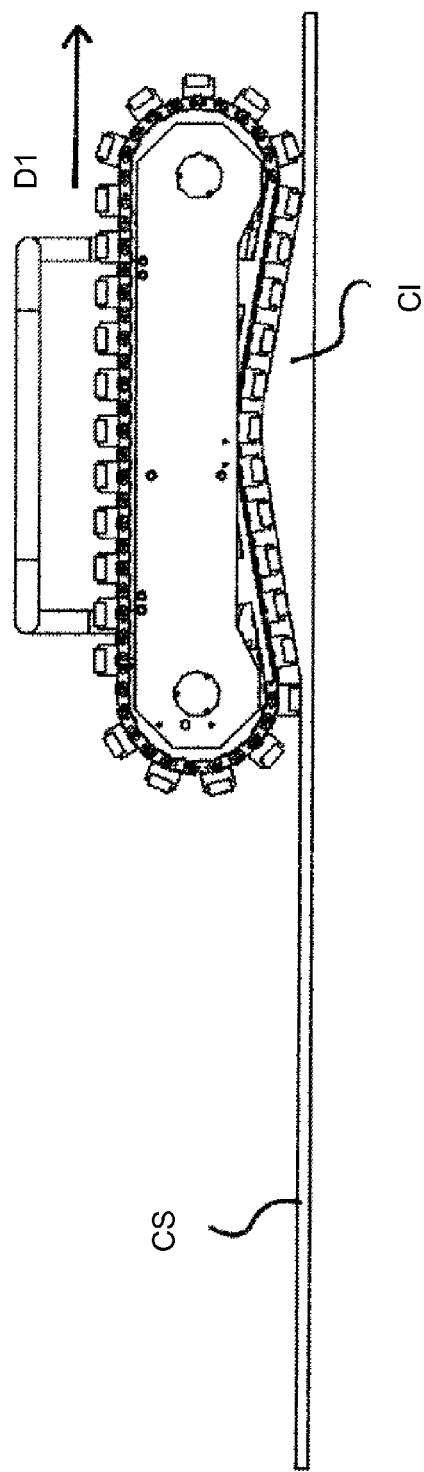

Referring to FIGS. 7-9, when a track adhering member 104 encounters an irregularity CI in the climbing-surface CS, the vehicle and suspension system ingeniously compensate for this surface irregularity CI with a high level of precision. Here an irregularity CI of the climbing-surface CS is defined as any spatial departure of the climbing-surface CS from a planar surface. Such surface irregularities may be concave or convex, sharply defined protrusions or rifts, or a, combination thereof.

The means of this notably effective compensation are employed as follows. The compliant beam portion 105 of the suspension deforms to match the contour of the climbing-surface CS irregularity Cl. While deformed, the compliant beam 105 portion maintains its slidable connection 103a to the endless-track 120. The contour-following bias-devices 108a, and 108 b, maintain tension or compression between the deformed compliant beam 105 and the rigid vehicle chassis 101, creating forces directed from the rigid vehicle chassis 101 toward the climbing-surface CS. These forces keep the chassis 101 in positive contact with the climbing-surface CS.

This in turn forces the fore track-sprocket 109 toward with the climbing-surface CS. The fore tangential guide linkage 106 then maintains contact of the compliant beam portion of the suspension and the leading adhering tractive members 104, guiding the compliant beam 105 to deform to match irregularities in the climbing-surface CS.

To better understand the device in negotiation of a climbing-surface CS, we refer to FIG. 7, a side view of the device climbing a surface CS prior to the surface irregularity CI, and compare it to FIG. 8. FIG. 9, a similar view of the device on a climbing-surface CS that has a significant contour or irregularity CI to be negotiated. The function of the compliant beam member 105 as it adapts to the climbing-surface CS contours and irregularities CI is demonstrated.

Also illustrated are the adaptive functions of the contour-following bias-devices 108a, 108b, and 108c in supporting the compliant beam member 105 while linking the compliant beam member 105 to the chassis 101, and the adaptive function of the tangential guide-linkages 106 and 107 and of the tensioning mechanism 118. Note particularly how the tensioning mechanism 118 adjusts to allow a greater total area of contact for the endless-track 103 to conform to brief climbing-surface CS contours and irregularities CI.

While the preceding description has described a preferred embodiment for the present invention, it should be understood by those skilled in the art that alternative configurations of the elements of the invention can be formed without departing from the primary scope of the present invention.

Thus, while the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A tracked vehicle comprising;
a chassis,
a drive mechanism,
an endless track, and,
a suspension apparatus;
the drive mechanism, comprising; a drive-motor, drive transmission unit, and one or more drive wheels, gears, or sprockets, including an upper leading drive wheel, gear, or sprocket and a lower trailing drive wheel, gear, or sprocket;
the endless track driven by the drive mechanism, and, comprising a chain, belt, or cable, said track comprising an exterior upon which are mounted a plurality of permanently magnetized adhering track-members,
the said endless track so configured and contrived as to provide traction in propulsion for the tracked vehicle;
said traction in propulsion achieved by cyclical motion of the endless track in a plane parallel to direction of motion of the vehicle,
said endless track and adhering track-members while so cyclically moving,
transitioning through a traction-portion of the track motion cycle, and a non-traction-portion of the track motion cycle,
the said traction-portion defined as that area of the track wherein said adhering track-members are situated proximal to a surface being transited;
the suspension apparatus supporting the chassis, and comprising tangential guide-linkages, bias-devices, and a compliant beam mechanism;
the compliant beam mechanism slidably directly connected to the endless track, and the chassis linked to the compliant beam by the tangential guide-linkages and bias-devices,
the compliant beam mechanism so contrived as to facilitate dynamic adaption of the compliant beam to contours of the surface being transited, by transiently deforming in such a way as to facilitate and preserve said adhering track-members contact with the said surface, for essentially all said track-members that are within the traction-portion of their cyclical motion;
the said tangential guide-linkages joined to the chassis by pivot-points upon which the linkage may rotate in a plane normal to the surface being transited and parallel to the plane of cyclical motion of the endless track,
the tangential guide-linkages joined to the compliant beam by pivot-points, upon which the linkage may rotate or slide;
said bias-devices located at one or more points along the compliant beam,
each said bias-device so contrived as to exert force upon the compliant beam at its particular point on the beam,
pulling or pushing in such a way as to govern pressure of the track against the transited surface at that tension point,
thereby promoting transient deformation of the compliant beam to conform with the topography of the surface being transited,
in such a way as to tend to more equally distribute track pressure against the transited surface, along the rest of the track within the traction-portion of the track motion,
and promote increased surface contact of all said adhering members along the rest of the track within the traction-portion of the track motion cycle, maximizing the area over which the adhering members of the endless track contact the surface being transited;

the said tracked vehicle also comprising a track tensioning device so contrived as to allow the amount of endless track within the traction-portion to increase or decrease as required to permit essentially all track members to contact contours of the surface being traversed and to conform to the contours of the compliant beam as the compliant beam transiently deforms to conform to the contours of the surface being traversed.

2. A vehicle as in claim 1, wherein the amount of bias in each said bias-device is adjustable.

3. A vehicle as in claim 1, wherein the tangential guide-linkages, bias-devices, and the compliant beam mechanism, comprise connecting members, said connecting members comprising pivotable connections between the vehicle chassis and the compliant beam mechanism.

4. A vehicle as in claim 1, wherein the chassis is adapted to facilitate carrying a payload.

5. A self-propelled climbing vehicle capable of traversing a surface of contours or irregularities, the vehicle comprised of;
one or more track modules,
a vehicle chassis, and
a drive mechanism;
the one or more track-modules, supporting the vehicle chassis, and having a posterior, an anterior, a left lateral portion, and a right lateral portion,
each of the one or more track-modules comprising an endless track;
the endless track having an external surface, and comprising a chain, belt, or cable, and a plurality of permanently magnetic adhering members distributed along the external surface;
the drive mechanism capable of providing propulsive power to the endless track, causing the endless track to cyclically move,
the area within which the said cyclical motion occurs, comprising a traction-portion and a non-traction-portion, through which the endless track transitions;
the vehicle chassis capable of carrying a payload, and attached to each of the one or more track-modules in such a way as to allow the module a degree of rotary movement about two axes, the first axis extending from the anterior to the posterior of the track-module, and the second axis extending from the left lateral portion to the right lateral portion, normal to the first axis;
each of the one or more track-modules also comprising a suspension apparatus,
the suspension apparatus, comprising a compliant beam mechanism, a track-guide, and a plurality of contour-following bias-devices and contour-following bias-device connecting members, so contrived as to dynamically conform motion, flow, and form of the endless track to contours of the surface being traversed in such a way as to maintain contact between said surface and essentially all said track adhering members that are within the traction-portion of their cyclical motion;
the compliant beam mechanism interacting with the endless track in such a way as to distribute load forces among the plurality of adhering track-members in immediate proximity to the surface being traversed,
in concert with the contour-following bias-device connecting members providing judiciously prescribed distribution of forces normal to the surface being traversed, along the portion of the endless track proximal to the surface being traversed so as to preserve and maximize track adhering members contact with the surface being traversed,
the contour-following bias-device and contour-following bias-device connecting members adjusted to such tension or compression as to enable the compliant beam member to flex and transiently deform, causing the external surface of the endless track to conform to contours of the surface being traversed, as it comes into contact with those contours;
said bias-devices located at one or more points along the compliant beam, each said bias-device,
so contrived as to exert force upon the compliant beam at its particular point on the beam,
in such a way as to govern pressure of the track against the transited surface at that tension point,
thereby promoting transient deformation of the compliant beam to conform with the topography of the surface being transited,
in such a way as to tend to more equally distribute track pressure against the transited surface, along the rest of the track within the traction-portion of the track motion cycle,
and promote increased surface contact of all said adhering members along the rest of the track within the traction-portion of the track motion cycle,
maximizing the area over which the adhering members of the endless track contact the surface being transited,
the compliant beam mechanism comprising a conjugate track-guide slidably directly connected to the portions of the endless track that is proximal to the surface being traversed, and connected to the vehicle chassis by suspension apparatus;
the said track-guide providing alignment of an endless track axis within its limits of flexibility and also providing alignment and orientation of the endless track with respect to the surface being traversed.

6. A vehicle as in claim 5, wherein the drive mechanism also comprises a rotary drive-motor.

7. A vehicle as in claim 5, wherein the drive mechanism also comprises a drive transmission unit.

8. A vehicle as in claim 5, wherein the drive mechanism also comprises drive wheels, gears, or sprockets.

9. A vehicle as in claim 5, wherein the amount of bias in each said bias-device is adjustable.

10. A vehicle as in claim 5, also comprising a track tensioning device so contrived as to allow the amount of endless track within the traction-portion to increase or decrease as may be required to allow essentially all said adhering track-members to maintain contact with contours of said surface being transited and to conform to the contours of the compliant beam as the form of the compliant beam changes to conform to the contours of the surface being transited.

11. A vehicle as in claim 5, also wherein the compliant beam mechanism is connected to the vehicle chassis by fore and aft tangential guide-linkages, the guide-linkages comprising;
a rigid link-plate for each said linkage,
a rotatably attached point for each said fore tangential guide link-plate, and,
a slidably attached point for each aft tangential guide link-plate,
the said tangential guide-linkages facilitating the flexing and surface contour conforming function of the compliant beam mechanism.

12. A vehicle as in claim 5, wherein the contour-following bias-device connecting members, have pivotable connections between the vehicle chassis and the compliant beam mechanism.

13. A vehicle as in claim 5, also wherein said one or more track-modules are so contrived as to have freedom of rotary movement about said two axes, both axes in planes normal to the climbing surface.

14. A tracked climbing vehicle capable of traversing a surface of contours or irregularities, the vehicle comprised of;
one or more track-modules,
a vehicle chassis, and,
one or more drive mechanisms;
the drive mechanism comprising; a drive-motor, drive transmission unit, and one or more drive wheels, gears, or sprockets, including an upper leading drive wheel, gear, or sprocket and a lower trailing drive wheel, gear, or sprocket;
  the one or more track-modules, supporting the vehicle chassis, and having a posterior, an anterior, a left lateral portion, and a right lateral portion,
    each of the one or more track-modules comprising an endless track;
    the endless track having an external surface, and comprising a chain, belt, or cable, and a plurality of permanently magnetic adhering members distributed along the external surface;
  the drive mechanism providing propulsive power to, the endless track, causing the endless track to cyclically move;
  the area within which the cyclical motion occurs, comprising a traction-portion and a non-traction-portion, through which the endless track transitions while in said cyclical motion;
  the vehicle chassis capable of carrying a payload, and attached to a track-module in such a way as to allow the module a degree of rotary movement about two axes, the first axis extending from the anterior to the posterior of the track-module, and the second axis extending from the left lateral portion to the right lateral portion, normal to the first axis;
  the track-module also comprising a track tensioning device so contrived as to allow the amount of endless track comprising the traction-portion to increase or decrease as may be required to promote contact by essentially all said track-members with contours of the surface being transited while transiting said surface being transited and to conform to the contours of the compliant beam as its form changes in accordance with the contours of the surface being transited,
  the track-module also comprising a suspension apparatus;
    the suspension apparatus, comprising a compliant beam mechanism, a track-guide, and a plurality of contour-following bias-devices and contour-following bias-device connecting members,
  so contrived as to dynamically conform motion, flow, and form of the endless track to contours of the surface being traversed in such a way as to maintain contact between said surface and essentially all said track adhering members that are within the traction-portion of their cyclical motion;
said bias-devices located at one or more points along the compliant beam, the amount of bias in each, being adjustable, each said bias-device so contrived as to exert force upon the compliant beam at its particular point on the beam,
in such a way as to govern pressure of the track against the transited surface at that tension point,
thereby promoting transient deformation of the compliant beam to conform with the topography of the surface being transited,
in such a way as to tend to more equally distribute track pressure against the transited surface, along the rest of the track within the traction-portion of the track motion cycle,
and promote increased surface contact of all said adhering members along the rest of the track within the traction-portion of the track motion cycle,
maximizing the area over which the adhering members of the endless track contact the surface being transited;
  the compliant beam mechanism interacting with the endless track, in concert with the contour-following bias-device connecting members, providing judiciously prescribed distribution of forces normal to the surface being traversed, along the portion of the endless track proximal to the surface being traversed so as to preserve and maximize track adhering members contact with the surface being traversed, and in such a way as to distribute load forces among the plurality of adhering track-members in immediate proximity to the surface being traversed;
the contour-following bias-device and contour-following bias-device connecting members adjusted to such tension or compression as to enable the compliant beam member to flex and transiently deform causing the external surface of the endless track to fit contours of the surface being traversed, pulling it back to transit surface bulges, and allowing it to extend to contact surface depressions;
  the compliant beam mechanism also comprising a track-guide, the compliant beam mechanism and track-guide conjugate and slidably directly connected to the portions of the endless track that is proximal to the surface being traversed, and connected to the vehicle chassis by suspension apparatus fore and aft tangential guide-linkages, the guide-linkages comprising;
  a rigid link-plate for each said linkage,
  a rotatably attached point for each said fore tangential guide link-plate,
  a slidably attached point for each aft tangential guide link-plate;
  the said track-guide providing alignment of an endless track axis within its limits of flexibility and also providing alignment and orientation of the endless track with respect to the surface being traversed.

15. A tracked climbing vehicle as in claim 14, wherein the contour-following bias-device connecting members are pivotably connected to the vehicle chassis and the compliant beam mechanism.

16. A vehicle suspension system comprised of
one or more track-modules, and
a vehicle chassis;
  the one or more track-modules, supporting the vehicle chassis, and having a posterior, an anterior, a left lateral portion, and a right lateral portion,
    each of the one or more track-modules comprising an endless track;
    the endless track having an external surface, and comprising a chain, belt, or cable, and a plurality of permanently magnetic adhering members distributed along the external surface;
    the track so contrived as to move cyclically,
    the area within which the cyclical motion occurs, comprising a traction-portion and a non-traction-portion, through which the endless track transitions while in said cyclical motion;

the vehicle chassis capable of carrying a payload, and attached to a track-module in such a way as to allow the module a degree of rotary movement about two axes, the first axis extending from the anterior to the posterior of the track-module, and the second axis extending from the left lateral portion to the right lateral portion, normal to the first axis;

the track-module also comprising a track tensioning device so contrived as to allow the amount of endless track within the traction-portion to increase or decrease as required to permit essentially all said track members to contact contours of a surface being traversed, and to conform to the contours of the compliant beam as the compliant beam transiently deforms to comply with the contours of the surface being traversed;

the track-module also comprising a suspension apparatus,
the suspension apparatus, comprising a compliant beam mechanism, a track-guide, and a plurality of contour-following bias-devices and contour-following bias-device connecting members, so contrived as to dynamically conform motion, flow, and form of the endless track to contours of the surface being traversed in such a way as to maintain contact between said surface and essentially all said track adhering members that are within the traction-portion of their cyclical motion;

the contour-following bias-device connecting members, having pivotable connections between the vehicle chassis and the compliant beam mechanism;

said contour-following bias-devices located at one or more points along the compliant beam, the amount of bias in each, being adjustable, each said contour-following bias-device so contrived as to exert force upon the compliant beam at its particular point on the beam, in such a way as to govern pressure of the track against the traversed surface at that tension point, thereby promoting transient deformation of the compliant beam to conform with the topography of the surface being traversed, in such a way as to tend to more equally distribute track pressure against the traversed surface, along the rest of the track within the traction-portion of the track motion cycle, and promote increased surface contact of all said adhering members along the rest of the track within the traction-portion of the track motion cycle, maximizing the area over which the adhering members of the endless track contact the surface being traversed;

the compliant beam mechanism interacting with the endless track, in concert with the contour-following bias-device connecting members, providing judiciously prescribed distribution of forces normal to the surface being traversed, along the portion of the endless track proximal to the surface being traversed so as to preserve and maximize track adhering members contact with the surface being traversed, and in such a way as to distribute load forces among the plurality of adhering track-members in immediate proximity to the surface being traversed;

the contour-following bias-device and connecting members adjusted to such tension or compression as to enable the compliant beam member to flex and transiently deform causing the external surface of the endless track to fit contours of a surface being traversed, pulling it back to transit surface bulges, and pushing it out in such a way as to maintain contact with surface depressions;

the compliant beam mechanism also comprising a track-guide, the compliant beam mechanism and track-guide conjugate and slidably directly connected to the portions of the endless track that is proximal to the surface being traversed, and connected to the vehicle chassis by suspension apparatus fore and aft tangential guide-linkages, the guide-linkages comprising;

a rigid link-plate for each said linkage, a rotatably attached point for each said fore tangential guide link-plate, a slidably attached point for each said aft tangential guide link-plate;

the said track-guide providing alignment of an endless track axis within its limits of flexibility and also providing alignment and orientation of the endless track with respect to the surface being traversed.

* * * * *